US006793883B2

(12) United States Patent
Andresen et al.

(10) Patent No.: US 6,793,883 B2
(45) Date of Patent: Sep. 21, 2004

(54) APPLICATION OF CATALYTIC NANOPARTICLES TO HIGH TEMPERATURE WATER SYSTEMS TO REDUCE STRESS CORROSION CRACKING

(75) Inventors: Peter Louis Andresen, Schenectady, NY (US); Thomas Martin Angeliu, Clifton Park, NY (US); Young Jin Kim, Clifton Park, NY (US); Thomas Pompilio Diaz, San Martin, CA (US); Samson Hettiarachchi, Menlo Park, CA (US)

(73) Assignee: General Electric Company, Niskayuna, NY (US)

( * ) Notice: Subject to any disclaimer, the term of this patent is extended or adjusted under 35 U.S.C. 154(b) by 384 days.

(21) Appl. No.: 09/681,993

(22) Filed: Jul. 5, 2001

(65) Prior Publication Data

US 2003/0012686 A1 Jan. 16, 2003

(51) Int. Cl.[7] .................................................. C23F 11/02
(52) U.S. Cl. .......................... 422/7; 376/305; 376/306; 422/11; 422/14; 422/19; 501/151
(58) Field of Search ................................. 422/11, 7, 12, 422/14, 19; 376/305, 306; 501/151

(56) References Cited

U.S. PATENT DOCUMENTS

| 5,130,080 A | 7/1992 | Niedrach |
| 5,130,081 A | 7/1992 | Niedrach |
| 5,164,152 A | 11/1992 | Kim et al. |
| 5,602,888 A | 2/1997 | Hettiarachchi et al. |
| 5,608,766 A | 3/1997 | Andresen et al. |
| 5,733,096 A | 3/1998 | Van Doren et al. |
| 5,768,330 A | 6/1998 | Andresen et al. |
| 5,818,893 A | 10/1998 | Hettiarachchi |
| 5,904,991 A | 5/1999 | Hettiarachchi |
| 6,316,377 B1 * | 11/2001 | Fulton et al. ................ 501/151 |

FOREIGN PATENT DOCUMENTS

JP            00329895 A     11/2000

OTHER PUBLICATIONS

Corrosion 2000, Paper No. 00184, "*Noble Metal Chemical Addition for IGSCC Mitigation of BWRs–Field Successes*", S. Hettiarachchi et al., GE Nuclear Energy, San Jose, CA.
Swiss Association for Atomic Energy (SVA) Seminar on "Water Chemistry and Materials Behavior", Apr. 21–23, 1999, Brugg–Windisch, Switzerland, "*Experience of Duane Arnold Metal Chemical Addition*", Robert L. Cowan.

(List continued on next page.)

Primary Examiner—Krisanne Jastrzab
(74) Attorney, Agent, or Firm—Robert P. Santandrea; Patrick K. Patnode (57) ABSTRACT

A method and system for reducing stress corrosion cracking in a hot water system, such as a nuclear reactor, by reducing the electrochemical corrosion potential of components exposed to high temperature water within the structure. The method includes the steps of: providing a reducing species to the high temperature water; and providing a plurality of noble metal nanoparticles having a mean particle size of up to about 100 nm to the high temperature water during operation of the hot water system. The catalytic nanoparticles, which may contain at least one noble metal, form a colloidal suspension in the high temperature water and provide a catalytic surface on which a reducing species reacts with least one oxidizing species present in the high temperature water. The concentration of the oxidizing species is reduced by reaction with the reducing species on the catalytic surface, thereby reducing the electrochemical corrosion potential of the component.

98 Claims, 2 Drawing Sheets

OTHER PUBLICATIONS

VGB Chemistry Conference, Essen Germany, Oct. 27, 1999, *"Experience With Noble Metal Chemical Addition to BWRs"*, RL Cowan et al., GE Nuclear Energy, San Jose, CA, USA.

European Nuclear Conference, Nice, France, Oct., 1998, *BWR Water Chemistry Strategies for Simultaneously Minimizing Fuel Clad Corrosion, Mitigating IGSCC, and Minimizing Shut Down Dose Rates*, RL Cowan et al., GE Nuclear Energy, 175 Curtner Avenue, San Jose, CA 95125, USA.

1998 Japan International Conference on Water Chemistry in Nuclear Power Plants, Water Chemistry 98, Oct. 13–16, 1998, Kashiwazaki, Japan, *"Electrochemical Corrosion Potential Monitoring in Boiling Water Reactors"*, RL Cowan et al., GE Nuclear Energy, San Jose, CA, USA.

$7^{th}$ International Conference on Nuclear Engineering, Tokyo, Japan, April 19–23, 1999, ICONE–7492, *"Noble Metal Chemical Addition...from Development to Commerical Application"*, Samson Hettiarachchi et al., GE Nuclear Energy, 175 Curtner Avenue, San Jose, CA 95125, USA.

1998 Japan International Conference on Water Chemistry in Nuclear Power Plants, Water Chemistry 98, Oct. 13–16, 1998, Kashiwazaki, Japan, *"First Application of Noblechem ™ To An Operating BWR"*, S. Hettiarachchi et al., GE Nuclear Energy, San Jose, CA, USA.

1998 Japan International Conference on Water Chemistry in Nuclear Power Plants, Water Chemistry 98, Oct. 13–16, 1998, Kashiwazaki, Japan, *"Fuel Performance After One Cycle Exposure in the Noble Metal Chemical Addition Lead Plant"*, HA Levin et al.

* cited by examiner

APPLICATION OF CATALYTIC NANOPARTICLES TO HIGH TEMPERATURE WATER SYSTEMS TO REDUCE STRESS CORROSION CRACKING

BACKGROUND OF INVENTION

This invention relates to reducing the electrochemical corrosion potential of components exposed to high-temperature water. More particularly, this invention relates to the application of catalytic nanoparticles to high temperature water systems to obtain improved protection from corrosion and intergranular stress corrosion cracking (IGSCC).

Nuclear reactors are used in central-station electric power generation, research, and propulsion. A reactor pressure vessel contains the reactor coolant, typically water, which removes heat from the nuclear core. Piping circuits carry the heated water or steam to steam generators or turbines and carry circulated water or feedwater back to the reactor vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental, and radiation conditions.

The materials exposed to high-temperature water in a nuclear reactor include carbon steel, alloy steel, stainless steel, nickel-based alloys, cobalt-based alloys, and zirconium-based alloys. Despite careful selection and treatment of these materials, corrosion occurs when the materials are exposed to the high-temperature reactor water. Such corrosion contributes to a host of problems, including stress corrosion cracking, crevice corrosion, erosion corrosion, sticking of pressure relief valves, and buildup of gamma radiation-emitting isotopes such as Co-60.

Stress corrosion cracking (SCC) is one phenomenon that is known to occur in reactor components that are exposed to high-temperature water. Such components include structural members, piping, fasteners, and welds. As used herein, SCC refers to cracking propagated by static or dynamic tensile stressing acting in combination with corrosion at the crack tip. These reactor components are subject to a variety of stresses associated with differences in thermal expansion, operating pressures needed for containment of the reactor cooling water, residual stresses from welding, cold working, and other asymmetric metal treatments. Water chemistry, welding, heat treatment, and radiation may also increase the susceptibility of a metal or alloy component to SCC.

It is well known that SCC occurs at higher rates when oxygen is present in the reactor water. SCC is further increased in the presence of a high radiation flux, which produces oxidizing species, such as oxygen, hydrogen peroxide, and short-lived radicals by radiolytic decomposition of the reactor water. Such oxidizing species increase the electrochemical corrosion potential (ECP) of metals. Electrochemical corrosion potential, which is caused by a flow of electrons from anodic to cathodic areas on metallic surfaces, is a measure of the thermodynamic tendency for corrosion phenomena to occur, and is a fundamental parameter in determining rates of SCC, corrosion fatigue, corrosion film thickening, and general corrosion.

In a BWR, the radiolysis of the primary water coolant in the reactor core causes a small fraction of the water to decompose, forming $H_2$, $H_2O_2$, $O_2$ and oxidizing and reducing radicals. At steady-state operating conditions, equilibrium concentrations of $O_2$, $H_2O_2$, and $H_2$ are established in both the recirculated water and the steam going to the turbine. The $O_2$ and $H_2O_2$ generated by radiolysis are oxidizing species and produce conditions that can promote intergranular stress corrosion cracking (IGSCC) of materials within the BWR. One method of mitigating IGSCC of susceptible material is through the application of hydrogen water chemistry (HWC), in which hydrogen gas is added to the reactor feedwater. Hydrogen addition, by producing a more reducing condition in the reactor feedwater, has the effect of altering the oxidizing nature of the BWR environment. When the added hydrogen reaches the reactor vessel, it reacts with the radiolytically formed oxidizing species to yield water, thereby lowering the concentration of dissolved oxidizing species in the water in the vicinity of metal surfaces. The rates of these recombination reactions are dependent on local radiation fields, water flow rates, and other variables.

By reducing the level of oxidizing species, such as dissolved oxygen, in the water, the injected hydrogen also lowers the ECP of metals that are exposed to the high temperature water. Other factors, however, such as variations in water flow rates and the time or intensity of exposure to neutron or gamma radiation, result in the production of oxidizing species at different levels in different reactors. Thus, varying amounts of hydrogen may be needed to sufficiently reduce the level of oxidizing species and maintain the ECP below a critical potential required for mitigation of IGSCC in high-temperature water. As used herein, the term "critical potential" denotes an electrochemical corrosion potential at or below a range of values between about −0.230 and about −0.300 V based on the standard hydrogen electrode (SHE) scale. When the ECP of a system is greater than the critical potential, IGSCC proceeds at an accelerated rate. Conversely, IGSCC proceeds at a substantially lower rate when the ECP of a system is less than the critical potential. The ECP of metals, when exposed to water that contains oxidizing species such as oxygen, increases to a value above the critical potential, whereas the ECP will remain below the critical potential when the metal is exposed to water containing low levels of oxidizing species.

Electrochemical corrosion potentials of stainless steels in contact with reactor water containing oxidizing species can be reduced below the critical potential of some stainless steel components by injecting a quantity of hydrogen into the water that is sufficient to produce a dissolved hydrogen concentration of between about 50 and 100 ppb or greater. Conditions necessary to inhibit IGSCC can be established in certain locations of the reactor with adequate rates of hydrogen addition to the feedwater. Different locations in the reactor system require different levels of hydrogen addition. Much higher hydrogen injection levels are necessary to reduce the ECP within the high radiation flux of the reactor core, or when oxidizing cationic impurities, such as cupric ions, are present.

The IGSCC of 304 stainless steel (e.g., composition in weight % 18.0–20.0 Cr, 8.0–10.0 Ni, 2.00 Mn, 1.0 Si, 0.08 C, 0.08 S, 0.045 P) commonly used in BWRs can be mitigated by reducing the ECP of the stainless steel to values below −0.230 V(SHE). Hydrogen water chemistry (HWC) is an effective method of achieving this objective. However, the large amounts (e.g., at least about 100 ppb) of hydrogen that may be required to reduce the ECP below the critical potential can result in the production of short-lived N-16 species in the steam, which in turn produces a higher radiation level in the steam-driven turbine section of the BWR. For most BWRs, the amount of hydrogen that must be added to mitigate IGSCC of pressure vessel internal components results in an increase in the main steam line radiation monitor by a factor of five. This increase in main steam line radiation can cause high environmental dose rates that may require expensive investments in shielding and radiation exposure control. Thus, recent investigations have focused on obtaining the benefits of HWC while minimizing levels of hydrogen addition and, consequently, the main steam radiation dose rates.

U.S. Pat. No. 5,135,709 to Andresen et al. discloses a method for lowering the ECP on components formed from carbon steel, alloy steel, stainless steel, nickel-based alloys, and cobalt-based alloys that are exposed to high-temperature water. According to this method, a catalytic layer of a platinum group metal is formed on the surface of the component(s). As used herein, the term "high temperature water" denotes water having a temperature of about 100° C. or greater, steam, or the condensate thereof, and the term "catalytic layer" means a coating on a substrate, or a solute in an alloy formed into the substrate, the coating or solute being capable of catalyzing the reaction of oxidizing and reducing species on the surface of the substrate. As used herein, the terms "platinum group metal" or "noble metal" denote metals selected from the group consisting of platinum, palladium, osmium, ruthenium, iridium, rhodium, and mixtures thereof.

One effective approach to lowering the ECP of reactor components is to either coat or alloy the stainless steel surface with palladium or any other platinum group metal. The presence of palladium on the stainless steel surface reduces the hydrogen needed to reach the required IGSCC critical potential of about −0.230 V(SHE). To date, the palladium coating has been deposited by electroplating, electroless plating, plasma deposition, and related high-vacuum techniques, and palladium alloying has been carried out using standard alloy preparation techniques. Both of these approaches to platinum metal incorporation are ex situ techniques: they cannot be practiced during reactor operation. Thus, to be appropriately serviced, the reactor must be shut down. Reactor downtime is extremely expensive and extensive planning is needed to safely service the reactor during shutdown periods.

Accordingly, what is needed an improved process of protecting the components from corrosion and intergranular stress corrosion cracking, while eliminating the need for expensive and complicated reactor shutdowns. The present invention seeks to satisfy that need.

SUMMARY OF INVENTION

The present invention fulfills these and other needs by providing a method and a system for reducing the electrochemical corrosion potential of components exposed to high temperature water.

Accordingly, one aspect of the invention is to provide a method of reducing the electrochemical corrosion potential of a component exposed to high temperature water in a hot water system in which the presence of at least one oxidizing species in the high temperature water raises the electrochemical corrosion potential of the component. The method comprises the steps of: providing a reducing species to the high temperature water; providing a plurality of catalytic nanoparticles to the high temperature water, wherein each of the catalytic nanoparticles provides a catalytic surface on which the reducing species reacts with the at least one oxidizing species present in the high temperature water; and reacting the reducing species with the at least one oxidizing species on the catalytic surface and reducing the concentration of the at least one oxidizing species that is present within the high temperature water, thereby reducing the electrochemical corrosion potential of the component.

A second aspect of the present invention is to provide a method of providing at least one noble metal to a hot water system for catalyzing the formation of water from hydrogen and oxygen present within high temperature water in the hot water system. The method comprises the step of providing a plurality of noble metal nanoparticles to the high temperature water during operation of the hot water system, wherein the plurality of noble metal nanoparticles has a mean particle size of up to about 100 nm.

A third aspect of the present invention is to provide a method of reducing the electrochemical corrosion potential of a component exposed to high temperature water in a hot water system in which the presence of at least one oxidizing species in the high temperature water raises the electrochemical corrosion potential of the component. The method comprises the steps of: providing a reducing species to the high temperature water; providing a plurality of noble metal nanoparticles to the high temperature water during operation of the hot water system, wherein each of the plurality of noble metal nanoparticles provides a catalytic surface on which the reducing species reacts with the at least one oxidizing species present in the high temperature water, and wherein the plurality of noble metal nanoparticles has a mean particle size of up to about 100 nm; forming a colloidal suspension of the plurality of noble metal nanoparticles in the high temperature water; and reacting the reducing species with the at least one oxidizing species on the catalytic surface and reducing the concentration of the at least one oxidizing species that is present within the high temperature water, thereby reducing the electrochemical corrosion potential of the component.

A fourth aspect of the present invention is to provide a method of reducing the electrochemical corrosion potential of a component exposed to high temperature water in a nuclear reactor in which the presence of at least one oxidizing species in the high temperature water raises the electrochemical corrosion potential of the component. The method comprises the steps of: providing a reducing species to the high temperature water; providing a plurality of noble metal nanoparticles to the high temperature water within the nuclear reactor, wherein each of the plurality of noble metal nanoparticles provides a catalytic surface on which the reducing species reacts with the at least one oxidizing species present in the high temperature water, and wherein the plurality of noble metal nanoparticles has a mean particle size of up to about 100 nm; forming a colloidal suspension of the plurality of noble metal nanoparticles in the high temperature water; and reacting the reducing species with the at least one oxidizing species on the catalytic surface and reducing the concentration of the at least one oxidizing species that is present within the high temperature water, wherein the electrochemical corrosion potential of the component is reduced.

A fifth aspect of the present invention is to provide a system for reducing the electrochemical corrosion potential of a component exposed to high temperature water in a hot water system in which the presence of at least one oxidizing species in the high temperature water raises the electrochemical corrosion potential of the component. The system comprises: a reducing species, the reducing species being deliverable to the high temperature water; and a plurality of catalytic nanoparticles, the plurality of catalytic nanoparticles having a mean particle size of up to about 100 nm. The plurality of catalytic nanoparticles is deliverable to the high temperature water, wherein each of the plurality of catalytic nanoparticles provides a catalytic surface on which the reducing species reacts with the at least one oxidizing species present in the high temperature water. The reducing species reacts with the at least one oxidizing species on the catalytic surface, thereby reducing the concentration of the at least one oxidizing species that is present within the high temperature water, thereby reducing the electrochemical corrosion potential of the component.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms.

Figure 1:
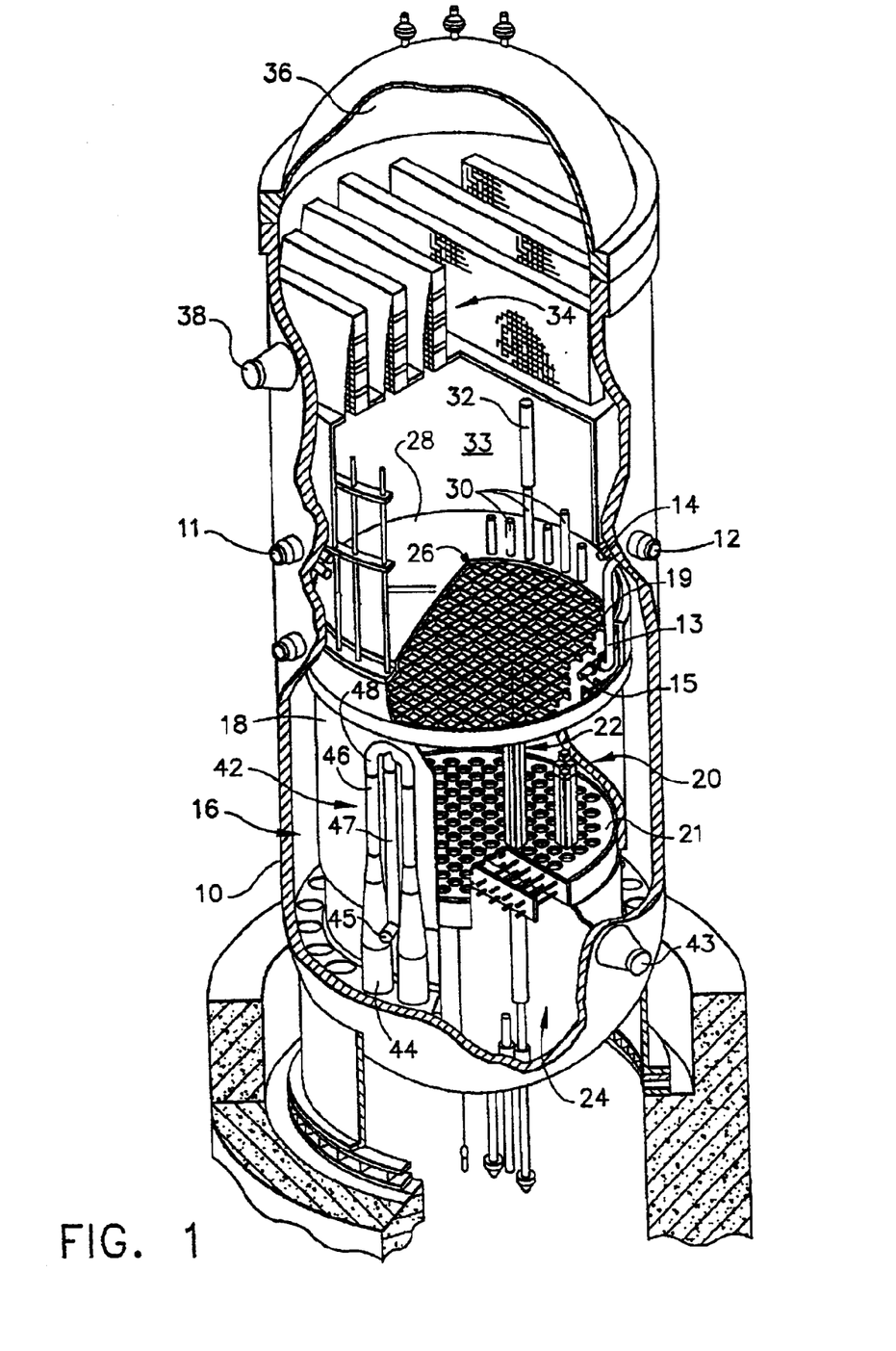
FIG. 1 is a schematic showing a partially cutaway perspective view of a conventional BWR.

Referring to the drawings in general and to FIG. 1 in particular, it will be understood that the illustrations are for the purpose of describing a preferred embodiment of the invention and are not intended to limit the invention thereto.

The fluid flow within a boiling water reactor will be generally described with reference to FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is typically a stainless steel cylinder which surrounds the core 20 comprising numerous fuel assemblies 22 (only two 2×2 arrays of which are depicted in FIG. 1). Each fuel assembly is supported at the top-by-top guide 19 and at the bottom by core plate 21. Water flowing through downcomer annulus 16 then flows to the core lower plenum 24.

The water subsequently enters the fuel assemblies 22 disposed within core 20, wherein a boiling boundary layer (not shown) is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, and the mixture then returns to the core via the downcomer annulus. The steam passes through steam dryers 34 and enters steam dome 36. The steam is withdrawn from the RPV via steam outlet 38.

The BWR also includes a coolant recirculation system that provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers.

Although described with respect to a BWR, the present invention is not limited to use within a boiling water nuclear reactor. Rather, the invention may be utilized in other structures in which structural components are exposed to high temperature water environments. Such structures include, but are not limited to, pressurized water nuclear reactors (PWRs), steam-driven turbines, water deaerators, and the like. As used herein, the term "high temperature water" denotes water having a temperature between 50° C. and about 320° C. and, preferably, between about 50° C. and about 290° C.

As discussed above, techniques that have been previously used to reduce the ECP have employed noble metals in the form of a catalytic surface layer on the various BWR components. The catalytic noble metal surface layers reduce the ECP by providing a catalytic surface site for reactions occurring between oxidants, such as, but not limited to, $O_2$ and $H_2O_2$, and reductants, such as $H_2$, hydrazine, and ammonia, the latter usually being present in stoichiometric excess. The techniques used to form this catalytic surface layer include electroplating, electroless deposition, alloying, thermal spray coating, sputtering, and the like. In all cases, a very precipitous decrease in electrochemical corrosion potential and a corresponding reduction in SCC is observed, even for dilute, sub-monolayer coverage of the noble metal on the component surfaces.

Prior-art noble metal chemical addition (NMCA) techniques for reducing electrochemical potential rely on precipitation or deposition of a catalytic species, typically a chemical compound containing a noble metal, onto the surfaces of components that are in contact with the high temperature water stream. Reactions between oxidizing and reducing species are heterogeneously catalyzed on the surface of the components. To date, the most efficient means for depositing the noble metal on component surfaces is a process now commercially known as NobleChem™, in which very dilute Pt and/or Rh salt solutions, such as, but not limited to, $Na_2Pt(OH)_6$ and $Na_3Rh(NO_2)_6$, are introduced into the reactor feedwater. Once the salts are injected into the feed water, $Pt^{4+}$ and/or $Rh^{3+}$ ions are distributed throughout the reactor water and deposit on all wetted surfaces.

In accordance with the invention, a method of reducing the electrochemical corrosion potential of a component exposed to high temperature water in a hot water system includes the steps of providing a reducing species to the high temperature water, providing a plurality of catalytic nanoparticles to the high temperature water, wherein each of the catalytic nanoparticles provides a catalytic surface on which the reducing species reacts with the at least one oxidizing species present in the high temperature water, and reacting the reducing species with the at least one oxidizing species on the catalytic surface, thereby reducing the concentration of the at least one oxidizing species that is present within the high temperature water and correspondingly reducing the electrochemical corrosion potential of the component.

The introduction of very fine catalytic nanoparticles, particularly noble metal nanoparticles, represents an alternative delivery mechanism for creating catalytic surfaces. Normal metal powders are much too coarse for this purpose. Nanophase materials, referred herein as "nanoparticles", are widely recognized in the art as having physical properties that are markedly distinct from those of ordinary micron-size powders. As used herein, the terms "nanoparticle" and "nanoparticles" refer to particles having average diameters of less than about 100 nm. In the present invention, the catalytic nanoparticles have a particle size of between about 1 nm and about 100 nm and, preferably, between about 5 nm and about 50 nm. Due to the relatively large fraction of atoms located at the surface, nanoparticles possess very unique electrical, magnetic, mechanical and optical properties, such as, but not limited to, very high surface area and the ability to form colloidal suspensions. Particles having a diameter of about 9 nm, for example, may have a surface area of about 97 $m^2/g$ when fully dispersed. In the present invention, the catalytic nanoparticles have a surface area of between about 1 $m^2/g$ and about 300 $m^2/g$ and, preferably, between about 10 $m^2/g$ and about 100 $m^2/g$. There are many methods of fabricating nanoparticles, leading to a wide variation in the amount of agglomeration of particles. Typically, nanoparticles need to be dispersed to take advantage of their unique properties. Particle dispersion can be divided into three stages: wetting; separation of particles; and stabilization. Once wetted, the breakdown of agglomerates is typically achieved by collision or attrition. Methods used to disperse nanoparticles include ultrasonic energy and vigorous mixing or spraying. Nanoparticles, once dispersed, can remain in a colloidal suspension indefinitely due to Brownian motion.

Oxidizing species present in the high temperature water include, but are not limited to, oxygen ($O_2$), hydrogen peroxide ($H_2O_2$), and various radicals, such as OH—, and the like. Reducing species include, but are not limited to, hydrogen ($H_2$), hydrazine ($N_2H_2$), ammonia ($NH_3$), and the like. In a preferred embodiment, a catalytic nanoparticle provides a catalytic surface upon which hydrogen reacts with oxygen to form water. The reductants may already be present in the high temperature reactor water in equilibrium concentrations. Alternatively, the reductants may be introduced into the high temperature water and dissolved therein. In one such embodiment, an amount of hydrogen gas is introduced into the high temperature water such that the ratio of $H_2/O_2$ in the high temperature water has a value determined by weight of about 1:8.

The plurality of catalytic nanoparticles comprises at least one of platinum, palladium, osmium, ruthenium, iridium, rhodium, and oxides, nitrides, borides, phosphides, and mixtures of these metals. Preferably, the plurality of catalytic nanoparticles comprises at least one of palladium, platinum, rhodium, and combinations thereof. Additionally, the plurality of catalytic nanoparticles may comprise other chemical compounds containing at least one of platinum, palladium, osmium, ruthenium, iridium, and rhodium. Such compounds include intermetallic compounds formed with other elements.

In one embodiment of the present invention, the catalytic nanoparticles are deposited onto the component surfaces to provide a heterogeneous catalysis site. In another embodiment however, the plurality of catalytic nanoparticles are sufficiently buoyant to remain in a colloidal suspension in the high temperature water and act as homogenous catalysts for the reaction between oxidizing and reducing species within the high temperature water. The presence of a colloidal suspension of catalytic nanoparticles having a high surface area in the BWR water—when coupled with the presence of a stoichiometric excess of reductant—may cause an increase in radioactivity resulting from increased volatility of N-16 compounds that are produced by transmutation of O-16 to N-16 in the reactor core, otherwise known as "turbine shine." This method of providing the catalytic nanoparticles to the high temperature water may require that injection of the reductant (e.g., $H_2$) be temporarily suspended when the catalytic nanoparticles are initially introduced into the reactor to minimize the production of N-16 containing species. The ECP of the reaction components can be lowered in situ by providing the catalytic nanoparticles directly to the reactor feedwater, thus eliminating the need to remove the components for treatment with noble metal powders. The catalytic nanoparticles may be provided to the BWR feedwater during reactor operation, thus avoiding expensive and complicated BWR shutdowns. Alternatively, the catalytic nanoparticles may be added to the reactor feedwater during a scheduled reactor shutdown. Depending on the needs of the respective nuclear reactor, a predetermined amount of the catalytic nanoparticles can be introduced into the high temperature water in the reactor either continuously or incrementally at predetermined time intervals. Predetermined quantities of the catalytic nanoparticles can be introduced into the BWR to obtain a predetermined concentration of the catalytic nanoparticles in the high temperature reactor water. The concentration of catalytic nanoparticles, for example, is less than about 100 ppb, preferably between about 1 ppt and about 10 ppb, and more preferably between about 10 ppt to about 1 ppb.

Several options are available for introducing the catalytic nanoparticles in situ into the high temperature water to reduce the ECP. The catalytic nanoparticles can be introduced homogeneously so as to create colloidal floaters within the BWR, wherein the catalytic nanoparticles remain in colloidal suspension indefinitely due to Brownian motion. Alternatively, the catalytic nanoparticles can be introduced heterogeneously such that the catalytic nanoparticles deposit on the BWR component surfaces.

The catalytic nanoparticles may be provided to the high temperature water by first preparing a concentrated solution or suspension of the catalytic nanoparticles, using fluid media well known to those skilled in the art, and subsequently delivering the concentrated suspension to the reactor feedwater. Suitable media for forming such concentrated solutions or suspensions include, but are not limited to: water; alcohols such as ethanol, propanol, and n-butanol; and acids such as lower carboxylic acids, e.g. acetic acid, propionic acid, and butyric acid; or ketones such as acetone and acetylacetone; and combinations thereof. The catalytic nanoparticles may also be entrained in gaseous fluid media, such as air. Alternatively, the catalytic nanoparticles may be introduced in an nondispersed metallic form into the reactor feedwater.

In another embodiment, the catalytic nanoparticles can be mixed with at least one of a transition metal oxide powder and a transition metal powder to form a powder mixture. The transition metal oxide powder may comprise zinc oxide, iron oxide, or the like and the transition metal powder may comprise zirconium, yttrium, iron, zinc, or the like. The catalytic nanoparticles may be introduced into the high temperature water by first forming a shaped pellet comprising the catalytic nanoparticles and one of the transition metal oxide powder and transition metal powder and subsequently delivering the shaped pellet to the high temperature water of the BWR.

It is well known the art that the introduction of zinc into the reactor coolant water is very effective at reducing dose rates during shutdown. Zinc is incorporated into the oxide layer that is present on the surfaces of reactor components that are in contact with the high temperature water. Zinc displaces Co-60 in the oxide layer and creates a thinner, more protective oxide. Preferably, depleted ZnO (DZO), comprising an isotope of Zn that does not become activated in the reactor core, is introduced to the; reactor coolant by flowing a small fraction of the coolant through a bed containing pellets of DZO.

DZO may be combined with the catalytic nanoparticles, which preferably comprise a mixture of Pt and Rh nanoparticles. The rate of release of the catalytic nanoparticles is maintained at a sufficiently low level to ensure that the catalytic nanoparticle concentration in the high temperature reactor water does not enhance N-16 volatility. It should not pose a technical or manufacturing challenge to introduce Pt/Rh nanoparticles into the DZO powder prior to the pelletizing process. On a continuous delivery basis, introduction levels of less than about 1 ppb should be adequate; indeed, values as low as 1 ppt may be adequate.

In yet another embodiment, the catalytic nanoparticles are introduced into the high temperature water by coating a substrate with the catalytic nanoparticles to form at least one coated substrate, and delivering the coated substrate to the high temperature water. Once in the high temperature water stream, the catalytic nanoparticles detach from the substrate to form a colloidal suspension in the high temperature water stream.

The catalytic nanoparticles may be introduced into the high temperature water during various stages of operation of the reactor. The catalytic nanoparticles may be provided to the high temperature water in any of the embodiments described above during full power operation, cool down, outage, heat-up, hot standby, or low power operation of the reactor.

The catalytic nanoparticles of the present invention may be introduced into the high temperature water at any location within the reactor structure where thorough mixing of the catalytic nanoparticles in the high temperature water can occur. The locations at which the catalytic nanoparticles may be introduced into the high temperature water include, but are not necessarily limited to, residual heat removal (RHR) piping, recirculation piping, feedwater lines, core delta P lines, jet pump instrumentation lines, control rod drive cooling water lines, water level control points, reactor water clean-up (RWCU) systems, and the like. The various lines may be either open or closed to the remainder of the coolant system during introduction of the catalytic nanoparticles.

The temperature of the high temperature reactor water when the catalytic nanoparticles are introduced into to the reactor water is typically in the range between about 50° C. and about 290° C. for BWR reactors, and between about 50° C. and about 320° C. for PWR reactors. The temperature is generally in the range of 100–177° C. and, most frequently, between about 170° C. and about 185° C. If the catalytic nanoparticle addition is performed at full power operation, the reactor water temperature is between about 270° C. and about 290° C.

The following example serves to illustrate the advantages of the present invention.

EXAMPLE 1

Figure 2:
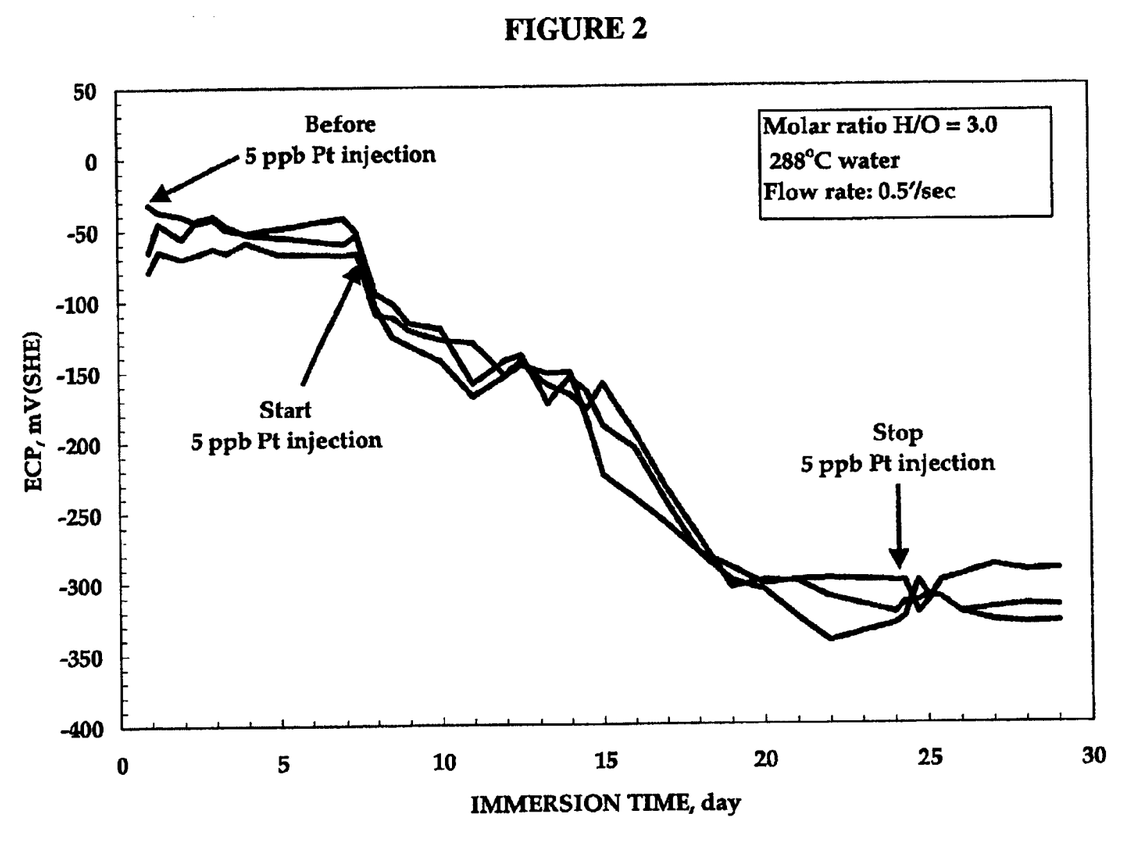
FIG. 2 is a plot of the electrochemical corrosion potential (ECP) of three different 304 stainless steel electrodes in 288° C. water containing excess hydrogen before, during, and after injection of platinum nanoparticles.

The catalytic effect of platinum nanoparticle additions in a simulated BWR environment was studied by introducing platinum nanoparticles into water held at 288° C. and containing excess hydrogen. The concentration of the platinum nanoparticles in the water was 5 ppb, and the molar ratio H:O was about 3:1. FIG. 2 is a plot of the electrochemical corrosion potential (ECP) of three different 304 stainless steel electrodes as a function of immersion time in 288° C. water containing excess hydrogen. Under excess hydrogen conditions, the ECP of the electrodes gradually decreased with increasing immersion time during the addition of 5 ppb of platinum nanoparticles. The results indicate that the presence of noble metal nanoparticles, either colloidally suspended in the high temperature water or deposited on the surface of the stainless steel electrodes, catalytically enhances the kinetics of the formation of water by oxygen and hydrogen present in the high temperature water, thereby reducing the ECP of the stainless steel electrodes.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A method of reducing the electrochemical corrosion potential of a component exposed to high temperature water in a hot water system in which the presence of at least one oxidizing species in the high temperature water raises the electrochemical corrosion potential of the component, the method comprising the steps of:

a) providing a reducing species to the high temperature water;

b) providing a plurality of catalytic nanoparticles, wherein the plurality of nanoparticles comprises at least one noble metal;

c) adding the plurality of catalytic nanoparticles to the high temperature water, wherein each of the catalytic nanoparticles provides a catalytic surface on which the reducing species reacts with the at least one oxidizing species present in the high temperature water; and d) reacting the reducing species with the at least one oxidizing species on the catalytic surface, thereby reducing the concentration of the at least one oxidizing species that is present within the high temperature water, wherein the electrochemical corrosion potential of the component is reduced.

2. The method of claim 1, further including the step of forming a colloidal suspension of the plurality of catalytic nanoparticles in the high temperature water.

3. The method of claim 2, wherein the step of reacting the reducing species with the at least one oxidizing species on the catalytic surface comprises homogeneously catalyzing at least one reaction between the reducing species and the at least one oxidizing species present within the high temperature water on the catalytic surface of each of the plurality of catalytic nanoparticles.

4. The method of claim 2, further including the step of depositing the plurality of catalytic nanoparticles in the colloidal suspension onto the component.

5. The method of claim 4, wherein the step of reacting the reducing species with the at least one oxidizing species on the catalytic surface comprises the step of heterogeneously catalyzing at least one reaction between the reducing species and the at least one oxidizing species present within the high temperature water on the catalytic surface of each of the plurality of catalytic nanoparticles that are deposited on the component surface.

6. The method of claim 1, wherein the at least one oxidizing species comprises one of oxygen, hydrogen peroxide, and hydroxyl radicals.

7. The method of claim 1, wherein the reducing species is one of hydrogen, hydrazine, and ammonia.

8. The method of claim 7, wherein the oxidizing species is oxygen and wherein the step of providing a reducing species to the high temperature water comprises dissolving a quantity of hydrogen gas in the high temperature water such that the ratio $H_2/O_2$ in the high temperature water has a value determined by weight of about 1:8.

9. The method of claim 1, wherein the plurality of catalytic nanoparticles comprises at least one of palladium, platinum, osmium, ruthenium, rhodium, iridium, rhenium, oxides thereof, nitrides, thereof, borides thereof, phosphides thereof, and combinations thereof.

10. The method of claim 9, wherein the plurality of catalytic nanoparticles comprises at least one of palladium, platinum, rhodium, and combinations thereof.

11. The method of claim 1, wherein the step of adding the plurality of catalytic nanoparticles to the high temperature water comprises continuously delivering a predetermined amount of the plurality of catalytic nanoparticles to the high temperature water.

12. The method of claim 1, wherein the step of adding the plurality of catalytic nanoparticles to the high temperature water comprises intermittently delivering a predetermined amount of the plurality of catalytic nanoparticles to the high temperature water at a predetermined time interval.

13. The method of claim 1, wherein the step of adding the plurality of catalytic nanoparticles to the high temperature water comprises preparing a concentrated suspension of the plurality of catalytic nanoparticles in one of water, ethanol, methanol, and combinations thereof, and delivering the concentrated suspension to the high temperature water.

14. The method of claim 1, wherein the step of adding the plurality of catalytic nanoparticles to the high temperature water further includes the steps of:
a) mixing the plurality of catalytic nanoparticles with at least one of a transition metal oxide powder and a transition metal powder to form a powder mixture; and
b) adding the powder mixture to the high temperature water.

15. The method of claim 14, wherein the transition metal oxide powder comprises at least one of zinc oxide and iron oxide.

16. The method of claim 14, wherein the transition metal powder comprises at least one of zirconium, yttrium, iron, and zinc.

17. The method of claim 1, wherein the step of adding the plurality of catalytic nanoparticles to the high temperature water comprises adding the plurality of catalytic nanoparticles in a nondispersed metallic form to the high temperature water.

18. The method of claim 1, wherein the step of adding the plurality of catalytic nanoparticles to the high temperature water comprises forming at least one shaped pellet containing the plurality of catalytic nanoparticles and adding the at least one shaped pellet to the high temperature water.

19. The method of claim 1, wherein the step of adding the plurality of catalytic nanoparticles to the high temperature water comprises coating at least one substrate with the plurality of catalytic nanoparticles to form at least one coated substrate, and adding the at least one coated substrate to the high temperature water.

20. The method of claim 1, wherein the step of adding the plurality of catalytic nanoparticles to the high temperature water comprises adding a predetermined amount of the plurality of catalytic nanoparticles to the high temperature water that is sufficient to obtain a predetermined concentration of the plurality of catalytic nanoparticles in the high temperature water.

21. The method of claim 20, wherein the predetermined concentration the plurality of catalytic nanoparticles is less than about 10 ppb.

22. The method of claim 21, wherein the predetermined concentration the plurality of catalytic nanoparticles is between about 1 ppt and about 1 ppb.

23. The method of claim 22, wherein the predetermined concentration of the plurality of catalytic nanoparticles is between about 10 ppt and about 1 ppb.

24. The method of claim 1, wherein the plurality of catalytic nanoparticles has a mean particle size of less than about 100 nm.

25. The method of claim 24, wherein the plurality of catalytic nanoparticles has a mean particle size of between about 5 nm and about 50 nm.

26. The method of claim 1, wherein the plurality of catalytic nanoparticles has a surface area of between about 1 $m^2/g$ and about 300 $m^2/g$.

27. The method of claim 26, wherein the plurality of catalytic nanoparticles has a surface area of between about 10 $m^2/g$ and about 100 $m^2/g$.

28. A method of providing a plurality of noble metal nanoparticles for catalyzing the formation of water from hydrogen and oxygen present within high temperature water in a hot water system, the method comprising the steps of providing a plurality of noble metal nanoparticles and adding the plurality of noble metal nanoparticles to the high temperature water during operation of the hot water system, wherein the plurality of noble metal nanoparticles has a mean particle size of up to about 100 nm.

29. The method of claim 28, wherein the plurality of noble metal nanoparticles has a mean particle size of between about 5 nm and about 50 nm.

30. The method of claim 28, wherein the plurality of noble metal nanoparticles has a surface area of between about 1 $m^2/g$ and about 300 $m^2/g$.

31. The method of claim 30, wherein the plurality of noble metal nanoparticles has a surface area of between about 10 $m^2/g$ and about 100 $m^2/g$.

32. The method of claim 28, wherein each of the plurality of noble metal nanoparticles comprises at least one of palladium, platinum, rhodium, and combinations thereof.

33. The method of claim 32, wherein the hot water system is one of a nuclear reactor, a steam-driven turbine, and a water deaerator.

34. The method of claim 32, wherein the hot water system is a nuclear reactor.

35. The method of claim 34, wherein the nuclear reactor is a boiling water nuclear reactor.

36. The method of claim 34, wherein the nuclear reactor is a pressurized water nuclear reactor.

37. A method of reducing the electrochemical corrosion potential of a component exposed to high temperature water in a hot water system in which the presence of at least one oxidizing species in the high temperature water raises the electrochemical corrosion potential of the component, the method comprising the steps or:
a) providing a reducing species to the high temperature water
b) providing a plurality of noble metal nanoparticles;
c) adding the plurality of noble metal nanoparticles to the high temperature water during operation of the hot water system, wherein each of the plurality of noble metal nanoparticles provides a catalytic surface on which the reducing species reacts with the at least one oxidizing species present in the high temperature water, and wherein the plurality of noble metal nanoparticles has a mean particle size of up to about 100 nm; and d) forming a colloidal suspension of the plurality of noble metal nanoparticles in the high temperature water; and e) reacting the reducing species with the at least one oxidizing species on the catalytic surface thereby reducing the concentration of the at least one oxidizing species that is present within the high temperature water, wherein the electrochemical corrosion potential of the component is reduced.

38. The method of claim 37, wherein the step of reacting the reducing species with the at least one oxidizing species on the catalytic surface composes homogeneously catalyzing at least one reaction between the reducing species and the at least one oxidizing species present within the high temperature water on the catalytic surface of each of the plurality of noble metal nanoparticles.

39. The method of claim 37, further including the step of depositing the plurality of noble metal nanoparticles in the colloidal suspension onto the component.

40. The method of claim 39, wherein the step of reacting the reducing species with the at least one oxidizing species on rite catalytic surface comprises the step of heterogeneously catalyzing at least one reaction between the reducing species and the at least one oxidizing species present within the high temperature water on the catalytic surface of each of the plurality of catalytic nanoparticles that are deposited on the component surface.

41. The method of claim 37, wherein the at least one oxidizing species comprises at least one of oxygen, hydrogen peroxide, hydroxyl radicals, and combinations thereof.

42. The method of claim 37, wherein the reducing species comprises at least one of hydrogen, hydrazine, ammonia, and combinations thereof.

43. The method of claim 37, wherein the oxidizing species is oxygen and wherein the step of providing a reducing species to the high temperature water comprises dissolving a quantity of hydrogen gas in the high temperature water such that the ratio $H_2/O_2$ in the high temperature water has a value determined by weight of about 1:8.

44. The method of claim 37, wherein each of the plurality of noble metal nanoparticles comprises at least one of palladium, platinum, osmium, ruthenium, rhodium, iridium, rhenium, and combinations thereof.

45. The method of claim 44, wherein the plurality of noble metal nanoparticles comprises at least one of palladium, platinum, rhodium, and combinations thereof.

46. The method of claim 37, wherein the step of adding the plurality of noble metal nanoparticles to the high temperature water comprises continuously delivering a predetermined amount of the plurality of noble metal nanoparticles to the high temperature water.

47. The method of claim 37, wherein the step of adding the plurality of noble metal nanoparticles to the high temperature water comprises intermittently delivering a predetermined amount of the plurality of noble metal nanoparticles to the high temperature water at a predetermined time interval.

48. The method of claim 37, wherein the step of adding the plurality of noble metal nanoparticles to the high temperature water comprises preparing a concentrated suspension of the plurality of noble metal nanoparticles in one of water, ethanol, methanol, and combinations thereof, and adding the concentrated suspension to the high temperature water.

49. The method of claim 37, wherein the step of adding the plurality of noble metal nanoparticles to the high temperature water comprises:

a) mixing the plurality of noble metal nanoparticles with at least one of a transition metal oxide powder and a transition metal powder to form a mixture; and b) adding the powder mixture to the high temperature water.

50. The method of claim 49, wherein the transition metal oxide powder comprises at least one of zinc oxide, and iron oxide.

51. The method of claim 49, wherein the transition metal powder comprises at least one of zirconium, yttrium, iron, and zinc.

52. The method of claim 37, wherein the step of adding the plurality of noble metal nanoparticles to the high temperature water comprises adding the plurality of noble metal nanoparticles in an nondispersed metallic form to the high temperature water.

53. The method of claim 37, wherein the step of adding the plurality of noble metal nanoparticles to the high temperature water comprises forming at least one shaped pellet containing the plurality of noble metal nanoparticles and adding the at least one shaped pellet to the high temperature water.

54. The method of claim 37, wherein the step of adding the plurality of noble metal nanoparticles to the high temperature water comprises coating at least one substrate with the plurality of noble metal nanoparticles to form at least one coated substrate, and adding the at least one coated substrate to the high temperature water.

55. The method of claim 37, wherein the step of adding the plurality of noble metal nanoparticles to the high temperature water comprises adding a predetermined amount of the plurality of noble metal nanoparticles to the high temperature water that is sufficient to obtain a predetermined concentration of the plurality of noble metal nanoparticles in the high temperature water.

56. The method of claim 55, wherein the predetermined concentration the plurality of catalytic nanoparticles is less than about 10 ppb.

57. The method of claim 56, wherein the predetermined concentration the plurality of catalytic nanoparticles is between about 1 ppt and about 10 ppb.

58. The method of claim 57, wherein the predetermined concentration of the plurality of catalytic nanoparticles is between about 10 ppt and about 1 ppb.

59. The method of claim 37, wherein the plurality of noble metal nanoparticles has a mean particle size of between about 5 nm and about 50 nm.

60. The method of claim 37, wherein the plurality of noble metal nanoparticles has a surface area of between about 1 $m^2/g$ and about 300 $m^2/g$.

61. The method of claim 60, wherein the plurality of noble metal nanoparticles has a surface area of between about 10 $m^2/g$ and about 100 $m^2/g$.

62. The method of claim 37, wherein the hot water system is one of a nuclear reactor, a steam-driven turbine, and a water deaerator.

63. The method of claim 62, wherein the hot water system is a nuclear reactor.

64. The method of claim 63, wherein the nuclear reactor is a boiling water nuclear reactor.

65. The method of claim 63, wherein the nuclear reactor is a pressurized water nuclear reactor.

66. A method of reducing the electrochemical corrosion potential of a component exposed to high temperature water in a nuclear reactor in which the presence of at least one oxidizing species in the high temperature water raises the electrochemical corrosion potential of the component, the method comprising the steps of:

a) providing a reducing species to the high temperature water;

b) providing a plurality of noble metal nanoparticles;

c) adding the plurality of noble metal nanoparticles to the high temperature water within the nuclear reactor, wherein each of the plurality of noble metal nanoparticles provides a catalytic surface on which the reducing species reacts with the at least one oxidizing species present in the high temperature water, and wherein the plurality of noble metal nanoparticles has a mean particle size of up to about 100 nm;

d) forming a colloidal suspension of the plurality of noble metal nanoparticles in the high temperature water; and e) reacting the reducing species with the at least one oxidizing species on the catalytic surface thereby reducing the concentration of the at least one oxidizing species that is present within the high temperature water, wherein the electrochemical corrosion potential of the component is reduced.

67. The method of claim 66, wherein the step of adding the plurality of noble metal nanoparticles to the high temperature water within the nuclear reactor comprises adding the plurality of noble metal nanoparticles to the high temperature water during operation of the nuclear reactor.

68. The method of claim 66, wherein the step of adding the plurality of noble metal nanoparticles to the high temperature water within the nuclear reactor comprises adding the plurality of noble metal nanoparticles to the high temperature water during one of cool down, outage, hot standby, or low power operation of the nuclear reactor.

69. The method of claim 66, wherein the step of adding the plurality of noble metal nanoparticles to the high temperature water within the nuclear reactor comprises adding the plurality of noble metal nanoparticles to the high temperature water through one of residual heat removal piping, recirculation piping, a feedwater line, a core delta P line, a jet pump instrumentation line, control rod drive cooling water lines, water level control points, and reactor water cleanup system of the nuclear reactor.

70. The method of claim 66, wherein the high temperature water has a temperature of between about 50° C. and about 320° C.

71. The method of claim 70, wherein the high temperature water has a temperature of between about 50° C. and about 290° C.

72. The method of claim 66, wherein the nuclear reactor is a boiling water nuclear reactor.

73. The method of claim 66, wherein the nuclear reactor is a pressurized nuclear reactor.

74. The method of claim 66, wherein the plurality of noble metal nanoparticles comprises at least one of palladium, platinum, osmium, ruthenium, rhodium, iridium, rhenium, and combinations thereof.

75. The method of claim 74, wherein the plurality of noble metal nanoparticles comprises at least one of palladium, platinum, rhodium, and combinations thereof.

76. A system for reducing the electrochemical corrosion potential of a component exposed to high temperature water in a hot water system, wherein the presence of at least one oxidizing species in the high temperature water raises the electrochemical corrosion potential of the component, the system comprising:

a) a reducing species, the reducing species being deliverable to the high temperature water; and b) a plurality of catalytic nanoparticles, the plurality of catalytic nanoparticles having a mean particle size of up to about 100 nm, wherein each of the plurality of catalytic nanoparticles comprises at least one noble metal and provides a catalytic surface on which the reducing species reacts with the at least one oxidizing species present in the high temperature water; and wherein the plurality of catalytic nanoparticles is deliverable to the high temperature water, wherein the reducing species reacts with the at least one oxidizing species on the catalytic surface, thereby reducing the concentration of the at least one oxidizing species that is present within the high temperature water, thereby reducing the electrochemical corrosion potential of the component.

77. The system of claim 76, wherein the at least one oxidizing species comprises at least one of oxygen, hydrogen peroxide, and hydroxyl radicals.

78. The system of claim 76, wherein the reducing species is one of hydrogen, hydrazine, and ammonia.

79. The system of claim 78, wherein the oxidizing species is oxygen and wherein the reducing species is delivered to the high temperature water by dissolving a quantity of hydrogen gas in the high temperature water such that the ratio $H_2/O_2$ in the high temperature water has a value determined by weight of about 1:8.

80. The system of claim 76, wherein the plurality of catalytic nanoparticles comprises at least one of palladium, platinum, osmium, ruthenium, rhodium, iridium, rhenium, oxides thereof, nitrides, thereof, borides thereof, phosphides thereof, and combinations thereof.

81. The system of claim 80, wherein the plurality of catalytic nanoparticles comprises at least one of palladium, platinum, rhodium, and combinations thereof.

82. The system of claim 76, wherein the plurality of noble metal nanoparticles has a mean particle size of between about 5 nm and about 50 nm.

83. The system of claim 76, wherein the plurality of noble metal nanoparticles has a surface area of between about 1 $m^2/g$ and about 300 $m^2/g$.

84. The system of claim 83, wherein the plurality of noble metal nanoparticles has a surface area of between about 10 $m^2/g$ and about 100 $m^2/g$.

85. The system of claim 76, wherein the hot water system is one of a nuclear reactor, a steam-driven turbine, and a water deaerator.

86. The system of claim 85, wherein the hot water system is a nuclear reactor.

87. The system of claim 86, wherein the nuclear reactor is a boiling water nuclear reactor.

88. The system of claim 86, wherein the nuclear reactor is a pressurized water nuclear reactor.

89. The system of claim 76, wherein the plurality of catalytic nanoparticles is deliverable to the high temperature water through one of residual heat removal piping, recirculation piping, a feedwater line, a core delta P line, a jet pump instrumentation line, control rod drive cooling water lines, water level control points, and reactor water cleanup system of the nuclear reactor.

90. The system of claim 76, wherein the plurality of catalytic nanoparticles is deliverable in a predetermined amount to the high temperature water.

91. The system, of claim 90, wherein the plurality of catalytic nanoparticles is intermittently deliverable in a predetermined amount to the high temperature water at a predetermined time interval.

92. The system of claim 76, wherein the plurality of catalytic nanoparticles is deliverable as a concentrated suspension of the plurality of catalytic nanoparticles in one of water, ethanol, methanol, and combinations thereof, wherein the concentrated suspension is introduced into the high temperature water.

93. The system of claim 76, wherein the plurality of catalytic nanoparticles is deliverable as a mixture of the plurality of catalytic nanoparticles with at least one of a transition metal oxide powder and a transition metal powder to form a powder mixture, wherein the powder mixture is introduced into the high temperature water.

94. The system of claim 93, wherein the transition metal oxide powder comprises at least one of zinc oxide and iron oxide.

95. The system of claim 93, wherein the transition metal comprises at least one of zirconium, iron, yttrium, and zinc.

96. The system of claim 76, wherein the plurality of catalytic nanoparticles is deliverable in a nondispersed metallic form, wherein the nondispersed metallic form is introduced into the high temperature water.

97. The system of claim 76, wherein the plurality of catalytic nanoparticles is deliverable as at least one shaped pellet containing the plurality of catalytic nanoparticles, wherein the at least one shaped pellet is introduced into the high temperature water.

98. The system of claim 76, wherein the plurality of catalytic nanoparticles is deliverable as at least one substrate coated with the plurality of catalytic nanoparticles to form at least one coated substrate, wherein the at least one coated substrate is introduced into the high temperature water.

* * * * *